July 28, 1925.
J. R. BARKER
DRAFT CONNECTION FOR PLOWS
Filed May 6, 1922
1,547,778
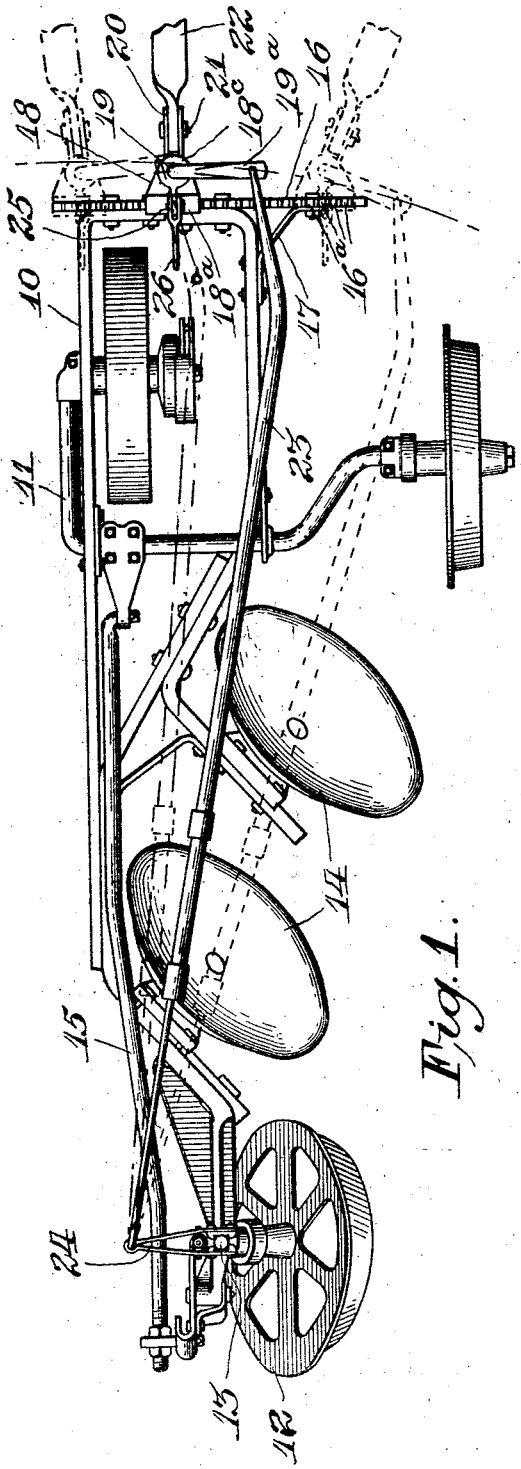
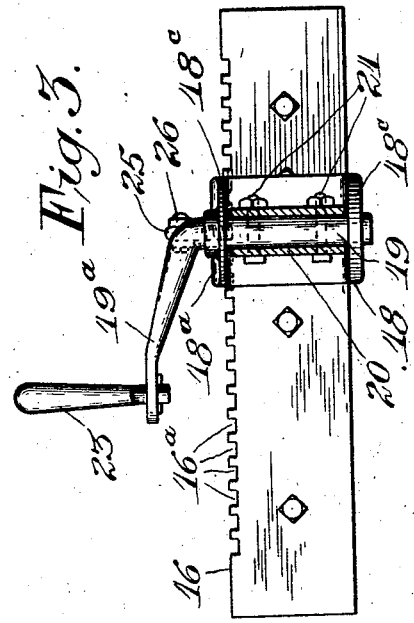
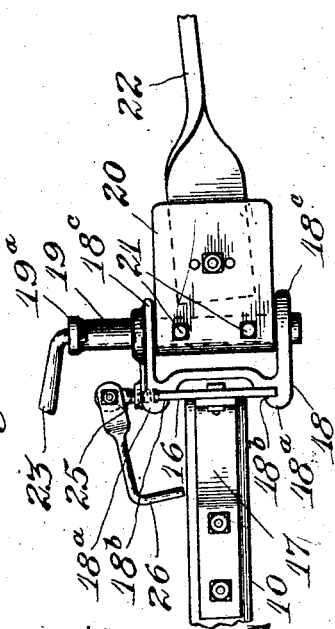
Inventor.
Joseph R. Barker,
By H. P. Dewitt,
Atty.

Patented July 28, 1925.

1,547,778

UNITED STATES PATENT OFFICE.

JOSEPH R. BARKER, OF LOS ANGELES, CALIFORNIA, ASSIGNOR TO INTERNATIONAL HARVESTER COMPANY, OF CHICAGO, ILLINOIS, A CORPORATION OF NEW JERSEY.

DRAFT CONNECTION FOR PLOWS.

Application filed May 6, 1922. Serial No. 559,090.

*To all whom it may concern:*

Be it known that I, JOSEPH R. BARKER, a citizen of the United States, residing at Los Angeles, in the county of Los Angeles and State of California, have invented certain new and useful Improvements in Draft Connections for Plows, of which the following is a full, clear, and exact specification.

This invention relates to tractor plows and more specifically to a draft connection therefor.

The objects of the invention are to provide tractor plows designed for use in orchards where, when plowing close to trees, it becomes necessary to offset the tractor from the plow, with a draft connection that is readily adjustable across the front of the plow while maintaining a constant connection with the rear furrow wheel and that automatically regulates the angle at which the draft bar projects as the draft connection is adjusted laterally.

These objects are accomplished by providing the front of the plow frame with a novel form of draft connection comprising a straight transverse bar on which a laterally adjustable bracket is mounted. This bracket supports a pivoted element which is provided with a crank connected by a rigid link to a crank on the rear furrow wheel standard, the pivoted element having a forwardly projecting draft bar secured thereto which is caused to project from the frame at varying angles according to adjustment of the bracket. The invention accordingly consists of the organization and parts or their equivalents hereinafter described and claimed.

Referring to the drawings—

Fig. 1 is a plan view of an orchard disk plow including my invention;

Fig. 2 is an enlarged side view of the draft connection; and

Fig. 3 is a similar view from the front.

In the present instance I have described my invention as applied to an orchard disk plow comprising the frame 10 the forward end of which is supported on a crank axle 11 and the rear end on the furrow wheel 12 which is swiveled to the frame on the standard 13. The frame is shown as carrying the usual disk plows 14 and it will be understood that the front axle is swung by a power lift mechanism, (not shown), to raise and lower the plows and that the rod 15 connects the front axle to the pivoted supporting bracket for the rear furrow wheel so that both the front and rear of the plow are raised and lowered in unison in the usual manner. The construction so far described forms no part of the present invention except as it cooperates therewith.

The elements composing my invention comprise the straight, flat plate or bar 16 which is rigidly secured to the front end of the plow frame 10 and projects a considerable distance on the furrow side of the plow where it is braced to the frame by the strap 17. This bar is positioned directly ahead of the plow bodies or disks and extends across the working space or path thereof. On the bar 16 there is slidably mounted a bracket 18 which is formed with rearwardly extending lugs 18$^a$ provided with opposed notches 18$^b$ which receive the upper and lower edges of the bar 16. The bracket 18 is also formed with forwardly projecting spaced lugs or arms 18$^c$ which are provided with bearing openings in which there is journaled a vertically extending compensating element or post 19 which has its upper end projecting above the bracket and is there bent at right angles to form a crank arm 19$^a$ which projects toward the furrow side of the plow. Between the arms 18$^c$ of the bracket 18 there is rigidly secured to post 19 a forwardly projecting clevis 20 which may be formed of a metal strap bent around the post 19 and secured thereto by bolts or rivets 21 as shown in Figs. 2 and 3. Between the projecting ends of the clevis 20 there is adjustably secured the rear end of a draft or coupling bar 22 which is preferably flat and twisted on itself as shown in the drawing and to which the tractor is intended to be coupled. The outer end of the crank arm 19$^a$ is perforated and receives the bent end of a connecting rod 23 which is preferably upwardly inclined or arched at its forward end and extends rearwardly toward the rear end of the plow where it is connected to the swiveled standard 13 of the rear furrow wheel through the medium of a crank arm 24 rigidly secured to the upper end of the standard and extending toward the land side of the plow. The connecting rod 23 is preferably made in two telescoping sections which may be relatively adjusted if desired and secured by any suitable means. In order to provide means for securing the bracket 18 to the bar 16 the upper edge of bar 16 may be provided with a series of notches 16ᵃ extending from end to end of the bar and the upper lug 18ᵃ on bracket 18 may be formed with a screw threaded opening in which there is mounted a screw stud 25 carrying a pivoted crank handle 26. With this device the screw stud 25 may be made to engage any of the notches 16ᵃ and the bracket positively locked in position by raising the crank handle 26 and turning the stud 25 as required. Handle 26, when released, will fall over and be out of the way of the tree limbs under which the plow is intended to work, the inclined forward part of connecting-rod 23 operating at the same time as a fender to lift the tree limbs free of the plow.

With the construction and arrangement described, the bracket 18, and with it the other elements of the draft connection, is given a wide range of adjustment across the front end of the plow and the bracket can be quickly and easily moved from end to end of the bar 16 and locked at any position by a few turns of the crank 26. This can be done without necessitating any adjustment in length of the rod 23 and without affecting the adjustment of the rear furrow wheel for the reason that the point of connection of rod 23 to arm 19ᵃ moves in an arc which has the point of connection of rod 23 to the furrow wheel crank 24 as a center, as indicated by the broken line, Fig. 1, and the operation of moving the bracket towards either end of bar 16 will therefore cause the compensating means comprising the arm 19ᵃ and post 19, and with it the draft bar 22, to swing to just the right angle with respect to the line of draft necessary to properly offset the tractor from the plow when working close to trees, as indicated in Fig. 1. At the same time the rear furrow wheel will be positively swiveled when turning around at the end of a furrow, irrespective of the adjusted position of bracket 18, in a manner to cause the plow to properly trail the tractor.

It will be understood that my invention is not limited to use with the particular type of plow here disclosed and that variations from the specific structure shown are contemplated within the scope of the following claims.

I claim as my invention:

1. The combination with a tractor plow having a rear furrow wheel mounted on a vertical standard, of a draft device comprising a straight transverse plate fixed to the front of the plow with its width extending vertically, a bracket slidably mounted on the edges of said bar and having means for locking it thereto at any point in its length, vertically spaced arms projecting forwardly from said bracket, a post pivoted in said arms and projecting above said bracket, a crank arm on the projecting end of said post and extending towards the furrow side of the plow, a crank arm on the furrow wheel standard extending in the opposite direction, a rigid link connecting said crank arms, and a draft coupling secured to said post between said arms.

2. The combination with a tractor plow including a rear furrow wheel mounted on a swiveled standard, of a draft device comprising a straight transverse bar fixed to the front of the frame and equal in length to the width of the working path of the plows, a bracket member slidably adjustable on said bar from end to end thereof, and compensating means carried by said bracket comprising a vertical post pivoted thereon and having a forwardly projecting draft bar fixed thereto, a crank arm on the post directed towards the furrow side of the plow and a link connecting said arm with a similar oppositely directed arm on the rear furrow wheel standard.

3. The combination with an orchard plow of a laterally shiftable tractor hitch comprising a plate extending across the front of the frame and equal in length to the working path of the plows, the width of said plate extending vertically and the upper edge thereof being toothed, a bracket slidably engaging the edges of the plate, locking means on the bracket cooperating with the toothed edge, a coupling bar pivoted on the bracket for lateral swing, and a horizontal crank arm fixed to the coupling bar and connected by a link with a point on the frame.

In testimony whereof I affix my signature.

JOSEPH R. BARKER.